(12) United States Patent
Liu et al.

(10) Patent No.: US 8,809,231 B2
(45) Date of Patent: Aug. 19, 2014

(54) METHOD FOR MAKING ALKALI ACTIVATED CARBON

(75) Inventors: Jia Liu, Painted Post, NY (US); Kamjula Pattabhirami Reddy, Corning, NY (US); Kishor Purushottam Gadkaree, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 265 days.

(21) Appl. No.: 13/247,211

(22) Filed: Sep. 28, 2011

(65) Prior Publication Data
US 2013/0078179 A1    Mar. 28, 2013

(51) Int. Cl.
*C01B 31/12*    (2006.01)

(52) U.S. Cl.
USPC ................................................. 502/427

(58) Field of Classification Search
USPC ................................................. 502/427
See application file for complete search history.

(56) References Cited

U.S. PATENT DOCUMENTS

| 8,252,716 | B2 * | 8/2012 | Gadkaree et al. ............ 502/416 |
| 2002/0048144 | A1 | 4/2002 | Sugo et al. |
| 2005/0018194 | A1 | 1/2005 | Thirstrup et al. |
| 2009/0214412 | A1 | 8/2009 | Ohshida et al. |

FOREIGN PATENT DOCUMENTS

| JP | 2003012316 | 1/2003 |
| JP | 2004018292 | 1/2004 |
| JP | 2007182358 | 7/2007 |
| JP | 2007302512 | 11/2007 |
| JP | 2011079705 | 4/2011 |
| JP | 2001163612 | 6/2011 |
| WO | 2010053864 | 5/2010 |
| WO | 2010053939 | 5/2010 |

OTHER PUBLICATIONS

Ahmadpour et al; "The Preparation of Activated Carbon From Macadamia Nutshell by Chemical Activation" Carbon, vol. 35, No. 12, pp. 1723-1732, 1997.

Ahmadpour et al; "The Preparation of Active Carbons From Coal by Chemical and Physical Activation" Carbon, vol. 34, No. 4, p. 471-479, 1996.

Cadek et al; "Bio-Based Materials for Supercapacitor"; Carbon 2007, Seattle WA, 2007.

Illan-Gomez et al; "Activated Carbons From Spanish Coals. 2. Chemical Activation"; Energy & Fuels, 1996, 10, 1108-1114.

Kadlec et al; "Structure of Pores of Active Carbons Prepared by Water-Vapour and Zinc-Dichloride Activation"; Carbon, 1970, vol. 8, p. 321-331.

Pandolfo et al; "Carbon Properties and Their Role in Supercapacitors"; Journal of Power Sources, 157 (2006) 11-27.

Teng et al; "Preparation of Porous Carbons From Phenol-Formaldehyde Resins With Chemical and Physical Activation"; Carbon 38 (2000) 817-824.

Tennison; "Phenolic-Resin-Derived Activated Carbons", Applied Catalysis A: General 173 (1998), 289-311.

Treusch et al; "Basic Properties of Specific Wood-Based Materials Carbonised in a Nitrogen Atmosphere"; Wood SCI Technol (2004) 38: 323-333.

Yue et al; "Preparation of Fibrous Porous Materials by Chemical Activation 1. ZnCl2 Activation of Polymer-Coated Fibers"; Carbon 40, (2002) 1181-1191.

Yeu et al; "Preparation of Fibrous Porous Materials by Chemical Activation 2. H3PO4 Actibation of Polymer Coated Fibers" Carbon 41 (2003) 1809-1817.

\* cited by examiner

*Primary Examiner* — Stuart Hendrickson
(74) *Attorney, Agent, or Firm* — Jason A. Barron

(57) ABSTRACT

A method for activating carbon via alkali activation processes includes the introduction of water vapor during the activation phase to control the formation of highly reactive by-products. The method includes heating the mixture of a carbon-containing first material and a alkali-containing second material, introducing water vapor at a first threshold temperature and stopping water vapor introduction at a second threshold temperature. The activated carbon material is suitable for carbon-based electrodes and for use in high energy density devices.

9 Claims, 1 Drawing Sheet

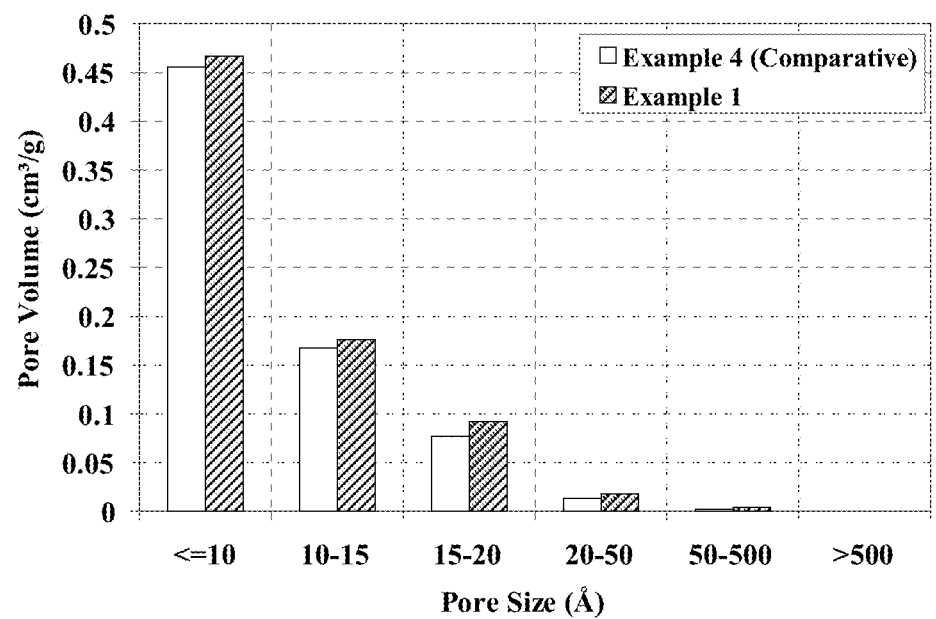

METHOD FOR MAKING ALKALI ACTIVATED CARBON

FIELD

The present disclosure relates generally to methods of activating carbon via alkali activation processes. In particular, the inventions disclosed herein relate to methods of controlled injection of water vapor into the reaction vessel to limit the production of unwanted by-products of the activation process.

BACKGROUND

Electrical energy storage is needed in many applications, such as electric/hybrid vehicles, portable electronic devices, and power systems. Traditionally, batteries of various kinds have been used for most applications. However, use of batteries in many new applications is complicated by their limited charge cycling ability, relatively slow discharge rates, and the toxicity of the chemicals incorporated into the batteries.

In recent years, electrochemical double layer capacitors (EDLCs, also referred to as ultracapacitors or supercapacitors) have emerged as an alternative to batteries in applications that require high power and long shelf and cycle life. Rather than two individual plates separated by an intervening substance, these capacitors use "plates" that are in fact two layers of the same substrate, the so-called "electrical double layer." As the name suggests, energy storage in an EDLC is achieved by separating and storing electrical charges in the electrochemical double layer at the interface between a solid surface and an electrolyte. The electrical properties of the electrical double layer result in the effective separation of charge despite the vanishingly thin (on the order of nanometers) physical separation of the layers. The lack of need for a bulky layer of dielectric permits the packing of "plates" with much larger surface area into a given size, resulting in their extraordinarily high capacitances in practical sized packages.

Activated carbon (or active carbon) is the most widely used material in EDLCs thanks to its very large surface area, good electrical and ionic conductivity, excellent chemical stability, and low cost. Alkali activation is one process for forming activated carbon. It relies on the carbonization of a carbonaceous precursor compound in an inert atmosphere at high temperatures, followed by chemical activation, typically using KOH or NaOH. One major disadvantage of alkali activation is that alkali metal can be produced as a reaction by-product, which can volatize and condense out in colder regions of the process equipment. This poses a significant safety hazard for large-scale production. In addition, it causes severe corrosion to the process equipment because of the volatile nature of alkali metals. Therefore, the alkali metal generated in the activation process must be "treated" before being exposed to ambient environment. Previously, treatment has been done by introducing water vapor, $CO_2$ or both to the equipment after the material has been cooled, thus converting the alkali metal to corresponding hydroxide and carbonate, which can then be safely discharged. This process has two disadvantages: first, extra process cycle time (for a batch process) or extra equipment such as a cooling chamber (for a continuous process) are required for the treatment and add to the process cost; and second, since the alkali metal is not treated until the end of the process cycle, safety issues pose a serious concern. If there are any cold spots in the equipment, the alkali metal tends to deposit and accumulate in those spots. As the deposit grows thicker, the amount of time required post-activation for water vapor or $CO_2$ to penetrate the deposit becomes longer. This increases the risk that an accident may occur during the activation process and requires longer process cycle times. In this disclosure, we describe a novel alkali activation process that addresses the above issues.

SUMMARY OF THE INVENTION

One aspect of the invention comprises a novel alkali activation process for the manufacture of activated carbon. In one embodiment, gas comprising a relatively low concentration of water vapor is introduced into the atmosphere in the furnace throughout the activation process, allowing alkali metal in the vapor phase to be converted to the equivalent hydroxide as soon as it is generated. This minimizes the absolute amount of alkali metal in the furnace at any point in time and eliminates the possibility of having alkali metal buried in thick deposits. Embodiments of the claimed invention enhance process safety and eliminate the need for extra process cycle time at the end of the reaction, thus reducing process costs. In some embodiments, the performance of the resulting activated carbon is not adversely affected.

Another aspect of the invention comprises a method activating carbon. One embodiment comprises a method of activating carbon comprising providing a first material comprising carbon; providing a second material comprising an alkali compound; forming a mixture comprising the first material and second material, wherein the ratio of alkali compound to carbon comprises 1:1 or greater; heating the mixture in a reaction vessel to a reaction vessel temperature from about 500° C. to about 1200° C.; introducing water vapor into the reaction vessel when the reaction vessel temperature comprises a temperature greater than or equal to a first threshold temperature; and discontinuing said introducing water vapor into the reaction vessel when the reaction vessel temperature comprises a temperature below a second threshold temperature. In some embodiments, the first and second threshold temperatures are different. In some embodiments, the reaction vessel is held at a maximum reaction vessel temperature for about 30 minutes to about 6 hours.

In some embodiments, the first threshold temperature comprises about 25° C. and the second threshold temperature comprises about 25° C. In some embodiments, the first threshold temperature comprises about 200° C. and the second threshold temperature comprises about 200° C. In some embodiments the first threshold temperature comprises about 400° C. and the second threshold temperature comprises about 400° C. In some embodiments the first threshold temperature comprises about 500° C. and the second threshold temperature comprises about 500° C.

In some embodiments, the concentration of water vapor in the reaction vessel comprises from greater than 0% to about 30% by volume. In some embodiments, the concentration of water vapor in the reaction vessel comprises from 1% to about 10% by volume. In some embodiments, the flow rate of water vapor into the reaction vessel comprises from about $1 \times 10^{-3}$ L/min per L of volume for the reaction vessel to about $1.5 \times 10^{-1}$ L/min per L of volume for the reaction vessel.

In some embodiments, the alkali compound comprises KOH, $K_2CO_3$, NaOH, $Na_2CO_3$, $Na_2O$, $Ca(OH)_2$, $KHCO_3$, $NaHCO_3$, KCl, NaCl, KF, NaF, or $MgCl_2$, or combinations thereof. In some embodiments, the ratio of alkali compound to carbon material comprises 1.8:1 or greater.

FIGURES

FIG. 1. Density Functional Theory (DFT) pore size distributions of activated carbon in the examples.

DETAILED DESCRIPTION

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its currently known embodiments. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

Carbon, as used herein, comprises amorphous carbon, but may further comprise graphitic carbon and/or non-graphitic carbon and optionally other forms of carbon. Carbon of the claimed invention may come from any source, for example, nut shells, wood or wood flour, biomass, synthetic resins such as polyvinyl alcohols and polyacrylonitriles, coal, and lignite.

Alkali compound, as used herein, comprises alkali and alkaline earth compounds that are capable of activating carbon. Examples of alkali compounds include silicates, hydroxides, oxides, chlorides, carbonates, and phosphates. Specific examples of alkali compounds include $Na_2O$, $K_2O$, KOH, NaOH, $Ca(OH)_2$, $Ba(OH)_2$, CsOH, $Sr(OH)_2$, $Mg(OH)_2$, LiOH, RbOH, $Li_2CO_3$, $Na_2CO_3$, $K_2CO_3$, $Rb_2CO_3$, $Cs_2CO_3$, $BeCO_3$, $CaCO_3$, $MgCO_3$, $SrCO_3$, or $BaCO_3$. Preferably, alkali compound comprises KOH, $K_2CO_3$, NaOH, $Na_2CO_3$, $Na_2O$, $Ca(OH)_2$, $KHCO_3$, $NaHCO_3$, KCl, NaCl, KF, NaF, or $MgCl_2$, or combinations thereof.

The alkali compound and carbon may be combined in any suitable ratio of 1:1 or greater. A ratio, expressed in weight percent of carbon to alkali compound, can range from about 1:1 to 1:10. Non-limiting exemplary ratios include 1:2, 1:3, 1:4, 1:5, 1:6, 1:7, 1:8, and 1:9. Preferably, the ratio of carbon to alkali compound comprises from about 1:1 to about 1:3.

First threshold temperature, as used herein, comprises a temperature reached on the heating cycle of the process. Alternatively, the second threshold temperature comprises a temperature reached on the cooling cycle of the reaction process. In some embodiments, the process involves adding the mixture to the reaction vessel, sealing the vessel and then heating the reaction vessel to the required temperature to activate the carbon. During the ramp up phase of heating the vessel, the reaction vessel will reach a first threshold temperature, wherein water vapor will be introduced into the reaction vessel. The introduction of water vapor will continue until the second threshold temperature is reached, and may comprise continuous or intermittent introduction, may comprise changes in concentration, may comprise the use of a closed or open loop system, and/or may comprise the use of feedback from the parameters within the reaction vessel. After some time at a temperature sufficient to activate the carbon, the reaction vessel is cooled or allowed to cool. During this ramp down phase, the reaction vessel will reach a second threshold temperature, wherein, as noted above, water vapor introduction will stop. Cooling of the reaction vessel may comprise the use of additional cooling components, such as liquid cooling systems, radiators, fans, or forced air.

In some embodiments, the first threshold temperature comprises room temperature, 25° C., 50° C., 75° C., 100° C., 150° C., 200° C., 250° C., 300° C., 350° C., 400° C., 450° C., 500° C., 550° C., 600° C., 650° C., 700° C., 750° C., 800° C., 850° C., 900° C., 950° C., 1000° C., 1100° C., 1200° C., 1300° C., or 1400° C. In some embodiments, the second threshold temperature comprises room temperature, 25° C., 50° C., 75° C., 100° C., 150° C., 200° C., 250° C., 300° C., 350° C., 400° C., 450° C., 500° C., 550° C., 600° C., 650° C., 700° C., 750° C., 800° C., 850° C., 900° C., 950° C., 1000° C., 1100° C., 1200° C., 1300° C., or 1400° C. The first and second threshold temperatures are independent of each other and do not have to be equivalent.

The reaction vessel may be held at a fixed temperature to allow for activation of the carbon. The fixed temperature may be from about 500 to about 1400° C. In some embodiments, the fixed temperature comprises about 500° C., 550° C., 600° C., 650° C., 700° C., 750° C., 800° C., 850° C., 900° C., 950° C., 1000° C., 1100° C., 1200° C., 1300° C., or 1400° C. The reaction vessel may be held at this fixed temperature for a time sufficient to allow at least a portion of the carbon to become activated. In some embodiments, the reaction vessel is held at the fixed temperature for 0.5, 1, 2, 3, 4, 5, 6, 7, or 8 hours.

Water vapor, as used herein, comprises water in the gas phase, whether produced by evaporation, boiling or sublimation, and may further comprise water condensed onto airborne microscopic particles. Water vapor concentrations in the reaction vessel may comprise from greater than 0% to about 30%. In some embodiments, water vapor concentrations by volume are about 0.5%, 0.75%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%. As noted previously, water vapor introduction into the reaction vessel may comprise a continuous or intermittent process, and further, may comprise changes in concentration. The water introduction system may comprise an open or closed loop system, and may comprise the use of feedback from the parameters within the reaction vessel. In some embodiments, the flow rate of water vapor into the reaction vessel comprises from about $1 \times 10^{-3}$ L/min per liter of volume of the reaction vessel to about $1.5 \times 10^{-1}$ L/min per liter of volume of the reaction vessel. In some embodiments, the flow rate of water vapor into the reaction vessel in L/min per liter of volume of the reaction vessel comprises about $1 \times 10^{-3}$, $2 \times 10^{-3}$, $3 \times 10^{-3}$, $4 \times 10^{-3}$, $5 \times 10^{-3}$, $6 \times 10^{-3}$, $7 \times 10^{-3}$, $8 \times 10^{-3}$, $9 \times 10^{-3}$, $1 \times 10^{-2}$, $2 \times 10^{-2}$, $3 \times 10^{-2}$, $4 \times 10^{-2}$, $5 \times 10^{-2}$, $6 \times 10^{-2}$, $7 \times 10^{-2}$, $8 \times 10^{-2}$, $9 \times 10^{-2}$, or $1 \times 10^{-1}$.

In addition to water vapor, the atmosphere in the reaction vessel may comprise inert gases, for example $N_2$ or Ar, $CO_2$, and/or other compounds that will react with the alkali compounds, such as alcohols.

In one embodiment of the claimed invention, activated carbon may synthesized by carbonizing a carbonaceous precursor in an water vapor containing atmosphere, for example $N_2$ or Ar, at a high temperature (commonly hundreds of degrees Celsius) followed by chemical activation, for example using KOH, $K_2CO_3$, NaOH, $Na_2CO_3$, $Na_2O$, $Ca(OH)_2$, $KHCO_3$, $NaHCO_3$, KCl, NaCl, KF, NaF, or $MgCl_2$. Chemical activation advantageously produces relatively large micropore volumes, uniform size pore distributions, and higher capacities which allows increased energy storage.

Embodiments of the process described in this disclosure has the following advantages compared with those in the prior art: 1) water vapor is present in the process atmosphere during the activation cycle so that any alkali metal in the vapor phase is converted to the corresponding hydroxide as soon as it is generated, minimizing absolute amount of alkali metal in the furnace at any point in time and enhancing process safety and 2) eliminates the need for extra process cycle time at the end as in the prior art. Further, the performance of the resulting activated carbon is not adversely affected.

EXAMPLES

Prospective Example 1

A conventional continuous- or batch-mode alkali activation process using KOH for the activating agent may be described as follows:

1. Prepare feed batch for activation by mixing a carbon powder with KOH using one of the two the following methods. A) The Impregnation Method—Mix the carbon powder with a KOH solution and subsequently dry the mixture. B) The Physical Mixing Method—Mix the carbon powder with a KOH solid, which can be in the form of powder, flakes, pellets, etc.

2. The carbon/KOH mixture is heated in a reaction vessel to a desired activation temperature, which is typically in the range of 600-1000° C., under an inert atmosphere (e.g. $N_2$, Ar, He, etc). After the desired amount of time of exposure to the activation temperature, the material is allowed to cool down.

3. Once the reaction vessel is below a certain temperature (e.g. 300° C.), water vapor or $CO_2$ or a combination of the two is delivered to the equipment to react with metallic potassium that is a by-product of the activation process.

Prospective Example 2

An embodiment of the claimed invention may be described as follows:

1. A KOH/carbon mixture is prepared as in Prospective Example 1.

2. The carbon/KOH mixture is heated. At a first threshold temperature, water vapor is introduced into the equipment during the entire thermal cycle or a portion of the thermal cycle. The reaction vessel is brought up to the desired temperature for a desired amount of time, and finally cooled down. During the cool down stage, the reaction vessel will cool to a second threshold temperature. Below the second threshold temperature, the introduction of water vapor into the reaction vessel is stopped. In some embodiments, the introduction of water vapor into the equipment is correlated to the portion of the thermal cycle when the furnace temperature is above the temperature at which alkali metal is produced and/or significant vapor pressure exists for the alkali metal. For example, in some embodiments the critical temperature is about 400° C. when KOH is used as the activation agent.

Example 1

A carbon powder, which was derived by carbonizing wheat flour at 800° C. in $N_2$ and milling the resulting char to d50 ~5 microns, was mixed with a KOH powder (Sigma-Aldrich Cat. No. 06103) at a ratio of 1:2.2 (w/w). The carbon/KOH mixture was contained in SiC crucibles and loaded into a box furnace. The furnace temperature was ramped up at 150° C./hr to 750° C., held at 750° C. for 2 hours, and then allowed to cool down naturally to room temperature. The furnace was purged with $N_2$ throughout the thermal cycle. When the furnace temperature reached 400° C. during ramp-up, water vapor was introduced to the furnace by bubbling $N_2$ through deionized (DI) water at room temperature. The water vapor concentration in the furnace atmosphere was estimated to be 1.5%. This water introduction was later stopped when the furnace temperature reached 300° C. during cool-down and the furnace was purged with neat $N_2$ until the furnace temperature reached 70° C. or lower when the furnace was unloaded. No signs of reaction related to metallic potassium were observed when the reaction vessel was exposed to ambient air. The resulting material was washed in dilute HCl and DI water until pH neutral and the activated carbon was filtered out. Finally, the activated carbon was filtered and heat treated in 1% $H_2/N_2$ at 675° C. for 2 hours.

Example 2

Same as Example 1 except that the water vapor concentration in the furnace atmosphere was 7.1%. No signs of reaction related to metallic potassium were observed when the material was exposed to ambient air.

Example 3

Same as Example 1 except that the water vapor concentration in the furnace atmosphere was 33%. No signs of reaction related to metallic potassium were observed when the material was exposed to ambient air.

Example 4

Comparative

The process was run similarly to Example 1. However, instead of introducing water vapor from 400° C. during ramp-up to 300° C. during cool-down, the furnace was purged with neat $N_2$ only until furnace temperature reached 100° C. during cool-down. Post-reaction, deposits of potassium metal were observed in the reaction vessel. In order to quench the potassium metal, $N_2$ was bubbled through hot deionized water to carry water vapor into the reaction vessel while the furnace temperature was held at 100° C. for 2 hours during. The furnace was then allowed to cool down while $N_2$ was bubbled through hot DI water for an additional hour. Finally the furnace was unloaded when the furnace temperature reached 70° C. or lower. The activated carbon was washed and heat treated in the same manner as in Example 1

In repeated experiments using the comparative process, solid deposits were consistently observed in the furnace. Even after the three-hour quench phase, it was observed that upon exposure to the ambient environment it was possible that the solid deposits would self-ignite resulting in flames and even explosions. In large-scale production, the hazards are expected to be significantly more severe.

The activated carbons obtained in the above examples were evaluated in button cells for EDLC performance. Button cell were made by blending activated carbon, carbon black (Black Pearl 2000, as conductive additive) and PTFE (as binder) in the proportion of 85:5:10 by weight and rolling the mixture into electrodes. 1.5 M tetraethylammonium tetrafluoroborate solution in acetonitrile was used as electrolyte. Test results on these button cells are shown in Table 1. It can be seen that activated carbons made in presence of relatively low concentrations of water vapor during activation (Examples 1 and 2) had similar EDLC performance as that in Comparative example 1, yet the introduction of water vapor at such levels was effective in eliminating risks associated with metallic potassium. At a higher water vapor concentration (Example 3), the performance was somewhat lower.

TABLE 1

EDLC performance of activated carbons measured in button cells

| Sample | Water Vapor Concentration During Activation | Csp, m (F/g) | Csp, v (F/cc) |
|---|---|---|---|
| Example 1 | 1.5% | 161.8 | 86.7 |
| Example 2 | 7.1% | 159.4 | 89.0 |
| Example 3 | 33% | 123.6 | 81.7 |
| Example 4 (Comparative) | N/A | 166.8 | 92.5 |

Pore size distributions derived from $N_2$ adsorption data using Density Functional Theory (DFT) in FIG. 1 confirmed that the activated carbon in Example 1 had essentially the same pore size distribution as the activated carbon formed in Comparative Example 4.

We claim:

1. A method of activating carbon comprising:
   a. providing a first material comprising carbon;
   b. providing a second material comprising an alkali compound;
   c. forming a mixture comprising the first material and second material, wherein the ratio of alkali compound to carbon comprises 1:1 or greater;
   d. heating the mixture in a reaction vessel to a reaction vessel temperature from about 500° C. to about 1200° C.;
   e. introducing water vapor into the reaction vessel when the reaction vessel temperature comprises a temperature greater than or equal to a first threshold temperature, wherein the first threshold temperature comprises about 200° C.; and
   f. discontinuing said introducing water vapor into the reaction vessel when the reaction vessel temperature comprises a temperature below a second threshold temperature, wherein the second threshold temperature comprises about 200° C.

2. The method of claim 1, wherein the first threshold temperature comprises about 400° C. and the second threshold temperature comprises 400° C.

3. The method of claim 1, wherein the first threshold temperature comprises about 500° C. and the second threshold temperature comprises about 500° C.

4. The method of claim 1, wherein the concentration of water vapor in the reaction vessel comprises from greater than 0% to about 30% by volume.

5. The method of claim 3, wherein the concentration of water vapor in the reaction vessel comprises from about 1% to about 10% by volume.

6. The method of claim 1, wherein the flow rate of water vapor into the reaction vessel comprises from about $1 \times 10^{-3}$ L/min per liter of volume for the reaction vessel to about $1.5 \times 10^{-1}$ L/min per liter of volume for the reaction vessel.

7. The method of claim 1, wherein the alkali compound comprises $Na_2O$, NaOH, KOH, $Ca(OH)_2$, $K_2CO_3$, $Na_2CO_3$, $KHCO_3$, $NaHCO_3$, KCl, NaCl, KF, NaF, or combinations thereof.

8. The method of claim 1, wherein the ratio of alkali compound to carbon material comprises 1.8:1 or greater.

9. The method of claim 1, wherein said reaction vessel is held at a maximum reaction vessel temperature for about 30 minutes to about 6 hours.

* * * * *